(12) United States Patent
Sawyers-Abbott et al.

(10) Patent No.: US 10,400,621 B2
(45) Date of Patent: Sep. 3, 2019

(54) PIVOT DOOR THRUST REVERSER WITH VARIABLE AREA NOZZLE

(71) Applicant: UNITED TECHNOLOGIES CORPORATION, Hartford, CT (US)

(72) Inventors: Nigel David Sawyers-Abbott, South Glastonbury, CT (US); Constantino V. Loffredo, Newington, CT (US)

(73) Assignee: United Technologies Corporation, Hartford, CT (US)

( * ) Notice: Subject to any disclaimer, the term of this patent is extended or adjusted under 35 U.S.C. 154(b) by 517 days.

(21) Appl. No.: 14/765,037

(22) PCT Filed: Feb. 27, 2014

(86) PCT No.: PCT/US2014/018825
§ 371 (c)(1),
(2) Date: Jul. 31, 2015

(87) PCT Pub. No.: WO2014/172016
PCT Pub. Date: Oct. 23, 2014

(65) Prior Publication Data
US 2015/0369078 A1  Dec. 24, 2015

Related U.S. Application Data

(60) Provisional application No. 61/772,161, filed on Mar. 4, 2013.

(51) Int. Cl.
*F02K 1/09* (2006.01)
*F02K 1/70* (2006.01)
(Continued)

(52) U.S. Cl.
CPC .............. *F01D 17/14* (2013.01); *F01D 9/04* (2013.01); *F01D 25/24* (2013.01); *F02K 1/09* (2013.01);
(Continued)

(58) Field of Classification Search
CPC ..................................... F02K 1/09; F02K 1/72
See application file for complete search history.

(56) References Cited

U.S. PATENT DOCUMENTS 3,747,341 A  7/1973  Davis
3,779,010 A  12/1973  Chamay et al.
(Continued)

FOREIGN PATENT DOCUMENTS

WO  9612881 A1  5/1996
WO  2007147954 A1  12/2007
WO  2009029401 A2  3/2009

OTHER PUBLICATIONS

Supplementary European Search Report for European Application No. 14785448.3 completed Oct. 13, 2016.
(Continued)

*Primary Examiner* — Andrew H Nguyen
(74) *Attorney, Agent, or Firm* — Carlson, Gaskey & Olds, P.C

(57) ABSTRACT

A gas turbine engine includes a nacelle assembly having a core nacelle defined about an engine axis and a fan nacelle assembly mounted at least partially around the core nacelle to define a fan bypass flow path. The fan nacelle assembly includes a fan duct nacelle section and a fan nozzle nacelle section moveable relative to the fan duct nacelle section. A thrust reverser system includes a plurality of pivot doors movable relative to the fan nacelle assembly between stowed and deployed positions. A variable area fan nozzle is in communication with the fan bypass flow path. A first actuator is mounted to the fan duct nacelle section to actuate the pivot door thrust reverser system, and a second actuator is mounted to the fan duct nacelle section to move the fan nozzle nacelle section relative to the fan duct nacelle section to vary a fan nozzle exit area.

22 Claims, 4 Drawing Sheets

(51) Int. Cl.
*F02K 1/72* (2006.01)
*F01D 17/14* (2006.01)
*F02K 1/12* (2006.01)
*F01D 9/04* (2006.01)
*F01D 25/24* (2006.01)
*F02K 1/15* (2006.01)
*F02K 1/76* (2006.01)
*F02K 3/075* (2006.01)

(52) U.S. Cl.
CPC .............. *F02K 1/1261* (2013.01); *F02K 1/15* (2013.01); *F02K 1/70* (2013.01); *F02K 1/72* (2013.01); *F02K 1/763* (2013.01); *F02K 3/075* (2013.01); *F05D 2220/32* (2013.01); *F05D 2270/62* (2013.01); *F05D 2270/64* (2013.01); *F05D 2270/65* (2013.01)

(56) References Cited

U.S. PATENT DOCUMENTS

| | | |
|---|---|---|
| 3,979,067 A | 9/1976 | Nash |
| 4,043,509 A | 8/1977 | McHugh et al. |
| 4,753,392 A | 6/1988 | Thayer et al. |
| 4,922,712 A * | 5/1990 | Matta ................ F02K 1/70 239/265.29 |
| 5,092,525 A | 3/1992 | Roach et al. |
| 5,101,533 A | 4/1992 | Stenger et al. |
| 5,476,224 A | 12/1995 | Tonks |
| 5,655,360 A | 8/1997 | Butler |
| 5,683,225 A | 11/1997 | Orlando et al. |
| 5,778,659 A | 7/1998 | Duesler et al. |
| 5,806,302 A * | 9/1998 | Cariola ................ F02K 1/09 239/265.29 |
| 6,070,407 A | 6/2000 | Newton |
| 6,895,742 B2 * | 5/2005 | Lair ................ F02K 1/70 239/265.37 |
| 7,637,095 B2 | 12/2009 | Winter et al. |
| 7,721,549 B2 | 5/2010 | Baran |
| 8,074,440 B2 | 12/2011 | Kohlenberg et al. |
| 8,104,262 B2 | 1/2012 | Marshall |
| 8,109,467 B2 | 2/2012 | Murphy |
| 8,151,551 B2 | 4/2012 | Pero |
| 8,505,307 B2 * | 8/2013 | Wang ................ F02K 1/09 239/265.25 |
| 2009/0255269 A1 | 10/2009 | Petty |
| 2009/0288386 A1 | 11/2009 | Marshall et al. |
| 2010/0005777 A1 | 1/2010 | Marshall |
| 2010/0058769 A1 | 3/2010 | Baran |
| 2010/0107600 A1 | 5/2010 | Hillel et al. |
| 2010/0126139 A1 * | 5/2010 | Howe ................ F02K 1/1207 60/226.2 |
| 2010/0146932 A1 | 6/2010 | Webster |
| 2011/0302907 A1 | 12/2011 | Murphy |
| 2011/0318173 A1 * | 12/2011 | Ramlaoui ............ B64D 29/06 415/182.1 |
| 2012/0023900 A1 * | 2/2012 | Flin ................ B64D 29/06 60/226.2 |
| 2012/0124962 A1 | 5/2012 | Parham |
| 2012/0137655 A1 | 6/2012 | Pero |
| 2013/0067884 A1 * | 3/2013 | Bhatt ................ F02K 1/72 60/204 |

OTHER PUBLICATIONS

International Preliminary Report on Patentability for International Application No. PCT/US2014/018825 dated Sep. 17, 2015.
International Search Report and Written Opinion for PCT Application No. PCT/US2014/018825, dated Dec. 26, 2014.

* cited by examiner

PIVOT DOOR THRUST REVERSER WITH VARIABLE AREA NOZZLE

CROSS-REFERENCE TO RELATED APPLICATION

This application claims priority to U.S. Provisional Application No. 61/772,161, filed Mar. 4, 2013.

BACKGROUND

A nacelle assembly for a gas turbine engine includes a core nacelle and a fan nacelle that surrounds the core nacelle to define a bypass flow path. Gas turbine engines on occasion use a variable area fan nozzle at a trailing edge of the nacelle assembly to vary a fan nozzle exit area as needed for various different flight conditions. Gas turbine engines also use a thrust reverser system that is deployed to provide a thrust reversal operation.

Variable area nozzle control systems add a significant amount of weight to the overall nacelle assembly in a fixed cascade/translating sleeve type thrust reverser in order to achieve a variable fan duct exit area. This is due to the necessity of translating a power drive mechanism from a main fan case compartment to the trailing edge of the nacelle assembly. The translation of the thrust reverser system must also be addressed. Further, this type of translating door mechanism takes up a significant amount of packaging space.

SUMMARY

In a featured embodiment, a nacelle assembly for a gas turbine engine has a core nacelle defined about an engine centerline axis. A fan nacelle is mounted at least partially around the core nacelle to define a fan bypass flow path. The fan nacelle includes a fan duct nacelle section and a fan nozzle nacelle section moveable relative to the fan duct nacelle section. A thrust reverser system includes a plurality of pivot doors movable relative to the fan nacelle between a stowed position and a deployed position. A variable area fan nozzle is in communication with the fan bypass flow path. A first actuator is mounted to the forward end of the fan duct nacelle section to actuate the pivot door thrust reverser system. A second actuator is mounted to the aft end of the fan duct nacelle section to move the fan nozzle nacelle section relative to the fan duct nacelle section to vary a fan nozzle exit area.

In another embodiment according to the previous embodiment, the first and second actuators operate independently of each other.

In another embodiment according to any of the previous embodiments, the first actuator is configured to pivot the plurality of pivot doors relative to the fan duct and nacelle section between the stowed and deployed positions.

In another embodiment according to any of the previous embodiments, the second actuator is configured to axially translate the fan nozzle nacelle section relative to the fan duct nacelle section.

In another embodiment according to any of the previous embodiments, the second actuator is configured to axially and radially translate the fan nozzle nacelle section relative to the fan duct nacelle section.

In another embodiment according to any of the previous embodiments, the first actuator comprises a plurality of first actuators.

In another embodiment according to any of the previous embodiments, the second actuator comprises a plurality of second actuators.

In another embodiment according to any of the previous embodiments, the first actuator comprises a plurality of first actuators and the second actuator comprises a plurality of second actuators.

In another embodiment according to any of the previous embodiments, the first actuator comprises a hydraulically, pneumatically or electrically driven actuator.

In another embodiment according to any of the previous embodiments, the second actuator comprises a hydraulically, pneumatically or electrically driven actuator.

In another embodiment according to any of the previous embodiments, the variable area fan nozzle comprises a ported variable area fan nozzle.

In another embodiment according to any of the previous embodiments, the variable area fan nozzle comprises a non-ported variable area fan nozzle.

In another embodiment according to any of the previous embodiments, the variable area fan nozzle comprises a ported variable area fan nozzle that moves both axially and radially.

In another embodiment according to any of the previous embodiments, the engine is provided with a core nacelle defined about an engine centerline axis and a fan nacelle mounted at least partially around the core nacelle to define a fan bypass flow path. The fan nacelle includes a fan duct nacelle section and a fan nozzle nacelle section positioned aft of the fan duct nacelle section. The method includes the steps of selectively actuating a pivot door thrust reverser system with a first actuator mounted to the fan duct nacelle section to move pivot doors between a stowed position and a deployed position. A second actuator mounted to the fan duct section is selectively actuated to move the fan nozzle nacelle section relative to the fan duct nacelle section to vary a fan nozzle exit area.

In another embodiment according to the previous embodiment, the first and second actuators are independently controlled.

In another embodiment according to any of the previous embodiments, the plurality of pivot doors pivot relative to the fan duct nacelle section with the first actuator.

In another embodiment according to any of the previous embodiments, the fan nozzle nacelle section is axially translated with the second actuator relative to the fan duct nacelle section.

In another embodiment according to any of the previous embodiments, the first actuator comprises a plurality of first actuators.

In another embodiment according to any of the previous embodiments, the second actuator comprises a plurality of second actuators.

In another embodiment according to any of the previous embodiments, the first actuator includes a plurality of first actuators. The second actuator includes a plurality of second actuators.

In another embodiment according to any of the previous embodiments, the variable area fan nozzle includes a ported variable area fan nozzle.

In another embodiment according to any of the previous embodiments, the variable area fan nozzle includes a non-ported variable area fan nozzle.

BRIEF DESCRIPTION OF THE DRAWINGS

The disclosure can be further understood by reference to the following detailed description when considered in connection with the accompanying drawings wherein.

DETAILED DESCRIPTION

Figure 1:
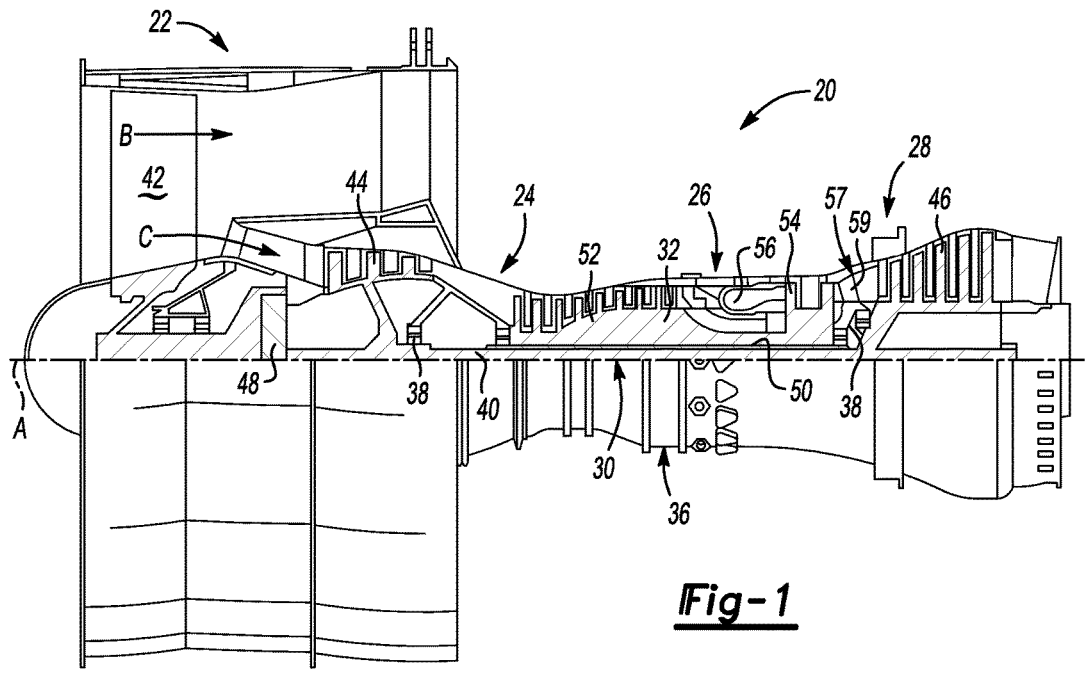
FIG. 1 schematically illustrates a geared turbofan engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV")

system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7\ °R)]^{0.5}$. The "Low corrected fan tip speed", as disclosed herein according to one non-limiting embodiment, is less than about 1150 ft/second.

Figure 2A:
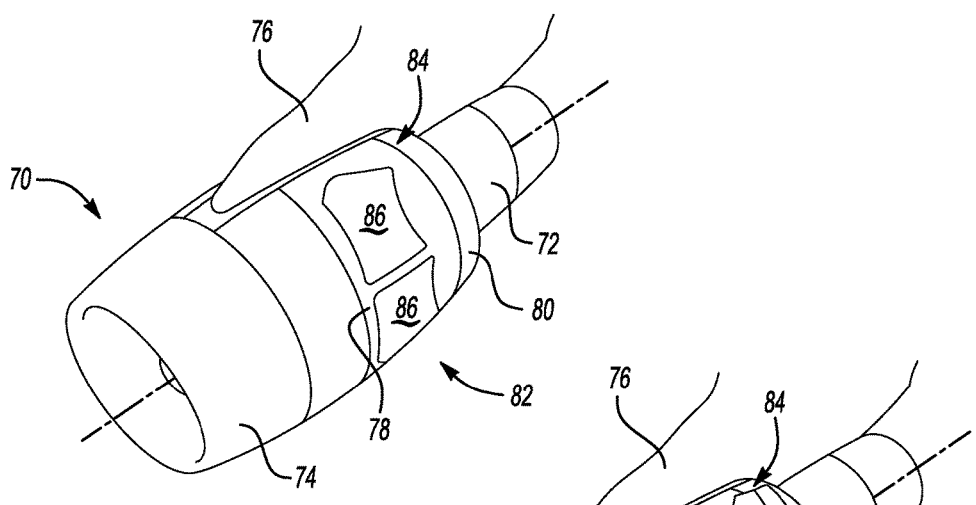
FIG. 2A is a perspective view of a nacelle assembly with pivot doors stowed.
Figure 2B:
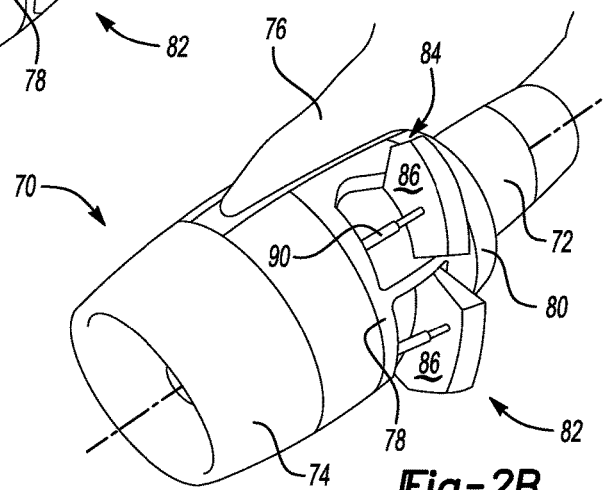
FIG. 2B is a perspective view of a nacelle assembly with pivot doors deployed.

FIGS. 2A-2B show a nacelle assembly 70 for the gas turbine engine 20 which includes a core nacelle 72 defined about the engine centerline axis A and a fan nacelle 74 mounted to surround the core nacelle 72 to define the fan bypass flow path B (FIG. 1). The nacelle assembly 70 is mounted to a pylon 76 that is mounted to an aircraft wing (not shown).

The fan nacelle assembly 70 includes a fan nacelle section 74, a fan duct nacelle section 78 and a fan nozzle section 80 that is moveable relative to the fan duct nacelle section 78. A thrust reverser system 82 is associated with the fan duct nacelle section 78 and a variable area fan nozzle system 84 is associated with the fan nozzle section 80. The thrust reverser system 82 includes a plurality of pivot doors 86 that are movable relative to the fan duct nacelle section 78 between a stowed position (FIG. 2A) and a deployed position (FIG. 2B). The variable area fan nozzle system 84 is used to vary a fan nozzle exit area 88 (FIGS. 3-4) for flow through the fan bypass flow path B.

As shown in FIGS. 3-6, at least a first actuator 90 is mounted to the forward end of the fan duct nacelle section 78 to actuate the thrust reverser system 82. At least a second actuator 92 is mounted to the aft end of the fan duct nacelle section 78 to move the fan nozzle nacelle section 80 relative to the fan duct nacelle section 78 to vary the fan nozzle exit area 88. The fan nozzle exit area 88 is defined at a location between a trailing edge 94 of the fan nozzle nacelle section 80 and an outer surface 96 of the core nacelle 72. The second actuator 92 moves the trailing edge 94 between a retracted position (FIGS. 3-4) and an extended area (FIG. 6) to change the fan nozzle exit area 88 as needed for various flight conditions.

Figure 3:
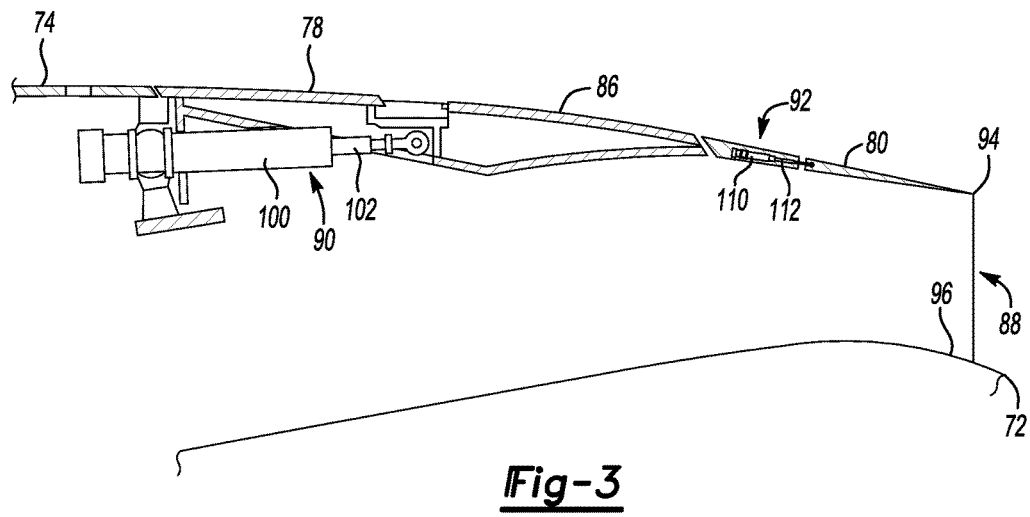
FIG. 3 is a side cross-sectional view of one example of an actuator for a thrust reverser system with the pivot doors stowed.
Figure 4:
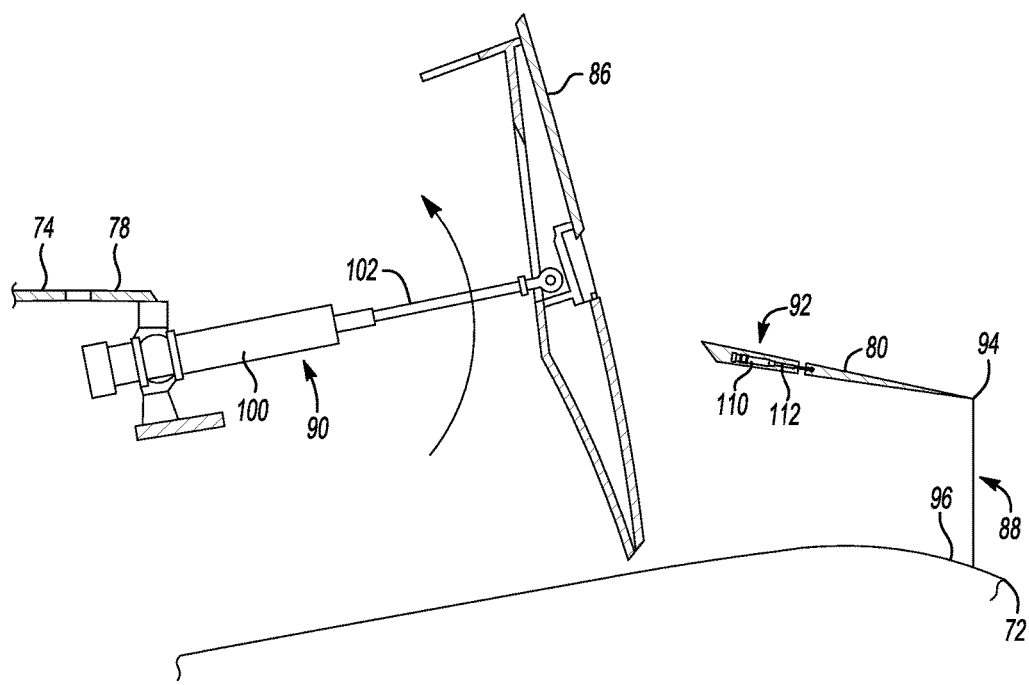
FIG. 4 is a side cross-sectional view of FIG. 3 with the pivot doors deployed.

FIG. 3 shows the pivot doors 86 stowed and the trailing edge 94 in a retracted position. In this example, the first actuator 90 comprises a hydraulic actuator; however, other types of actuators could also be used such as pneumatically or electrically driven actuators, for example. Further, while only one first actuator is shown, it should be understood that a plurality of actuators 90 could be used (see FIG. 2B, for example).

In this example, the first actuator 90 includes housing 100 that is mounted to the fan duct nacelle section 78 and an extendible rod 102 that is pivotally attached to the pivot doors 86. When the rod 102 is retracted into the housing 100 (FIG. 3) the pivot doors 86 are stowed. When the pivot doors 86 are stowed they are generally flush with the fan duct nacelle section 78. To deploy the pivot doors 86, a fluid pressure source is used to extend the rod 102 out of the housing 100, which causes the pivot doors 86 to rotate in the deployed position to provide reverse thrust as known. When the fluid pressure direction is altered, the rod 102 retracts back into the housing 100 and the pivot doors 86 return to their stowed position.

Figure 5:
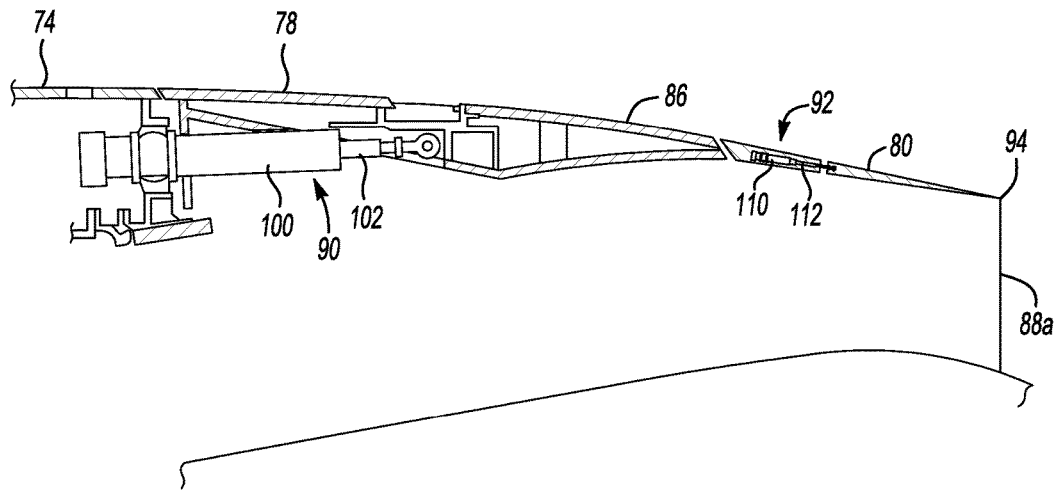
FIG. 5 is a side cross-sectional view of one example of an actuator for a variable area fan nozzle in a retracted position.
Figure 6:
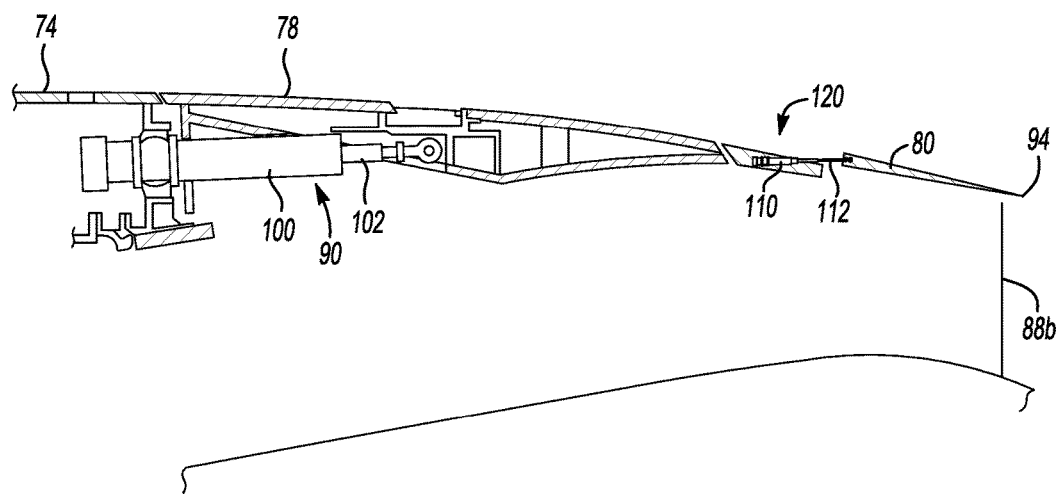
FIG. 6 is a side cross-sectional view of FIG. 5 in an extended position.
Figure 7:
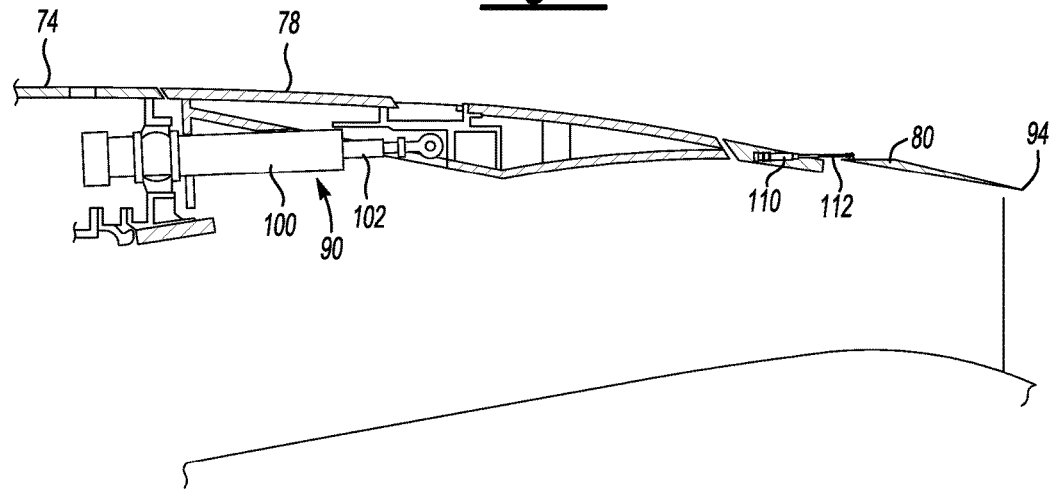
FIG. 7 is a side cross-sectional view of another example of an actuator for a variable area fan nozzle in an extended position for a non-ported configuration.

FIGS. 5-7 show the second actuator 92 in greater detail. FIG. 5 shows the fan nozzle nacelle section 80 with the trailing edge 94 in a retracted position to define a first nozzle exit area 88a. FIG. 6 shows the fan nozzle nacelle section 80 with the trailing edge 94 in the extended position to define a second nozzle exit area 88b that is greater than the first nozzle exit area 88a. In this example, the second actuator 92 comprises a hydraulic actuator; however, other types of actuators could also be used such as pneumatically or electrically driven actuators, for example. Further, while only one second actuator is shown, it should be understood that a plurality of second actuators 92 could be used.

In this example, the second actuator 92 includes housing 110 that is mounted to the fan duct nacelle section 78 and an extendible rod 112 that is attached to the fan nozzle nacelle section 80, which extends to the trailing edge 94. When the rod 112 is retracted into the housing 110 (FIG. 5) the trailing edge 94 is in the retracted position. To increase the nozzle exit area 88, a fluid pressure (hydraulic) source is used to extend the rod 112 out of the housing 110, which causes the trailing edge 94 to extend linearly in an axial direction that is generally common with the engine center axis A (FIG. 6). When the fluid pressure direction is altered, the rod 112 retracts back into the housing 110 and the trailing edge returns to its retracted position.

The example shown in FIG. 6 comprises a ported aerofoil configuration, which changes the exit area similar to US 2011/0302907, which is assigned to the assignee of the present invention and is hereby incorporated by reference. A non-ported aerofoil configuration 120, shown in FIG. 7, could also be used. The non-ported variable area nozzle translating assembly is enclosed inside the fan duct with sufficient axial space to prevent the leading edge of the nozzle assembly from translating rearward and opening an annular air gap that would allow additional air to be ducted into the external air stream. The ported configuration allows this gap to exist and is calculated as an additional area change to the rear most area change provided by the trailing edge of the translating assembly.

Figure 8:
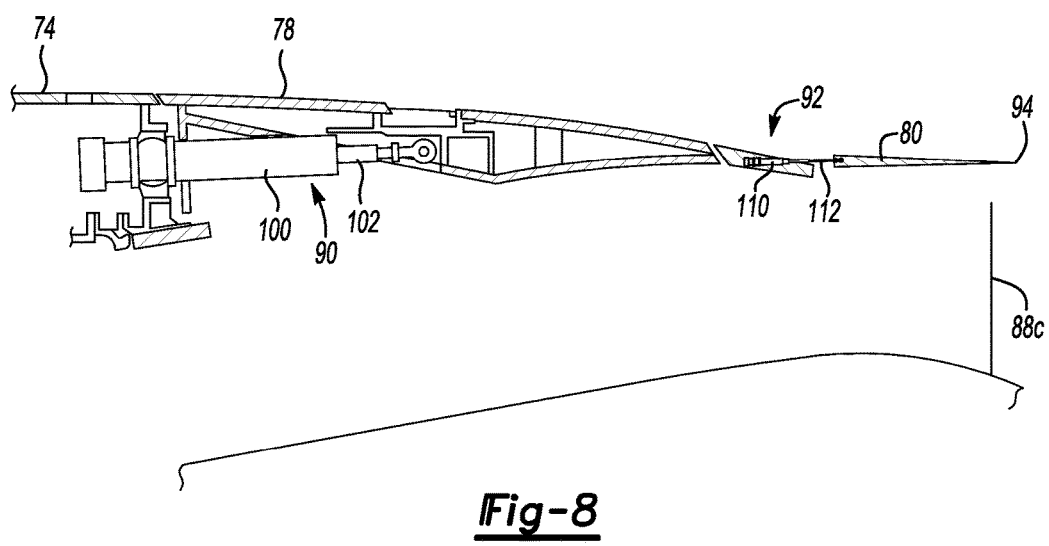
FIG. 8 is a side cross-sectional view of another example of an actuator for a variable area fan nozzle in an extended position for a ported configuration that changes fan duct exit area through axial and radial movement.

FIG. 8 shows the fan nozzle nacelle section 80 with the trailing edge 94 in the extended position to define a second nozzle exit area 88c that is greater than the first nozzle exit area 88a.

In this example, the second actuator 92 a fluid pressure (hydraulic) source is used to extend the rod 112 out of the housing 110, which causes the trailing edge 94 to extend linearly in an axial direction that is generally common with the engine center axis A (FIG. 6) and also pivot about a fixed point on the fan duct nacelle section 78 such that the fan nozzle section 80 also moves radially outboard from the engine center axis A. When the fluid pressure direction is altered, the rod 112 retracts back into the housing 110 and the trailing edges return to its retracted position.

The combination a reverse thrust system with pivot doors and an axially translating trailing edge for a variable fan nozzle exit area utilize separate actuators to provide a configuration that is easier to package. It is possible to mount the power drive mechanism and translating trailing edge mechanism to achieve variable area of the fan duct exit plane in a significantly smaller envelope than a translating door mechanism for reverse thrust. The pivot door reverser enables the fabrication of a simple, stiff fan duct reverser assembly and eliminates relatively large and heavy translating sleeve fan duct reverser assemblies. The installation also features a separate translating sleeve at the fan nozzle exit to facilitate fan exit area change. The combination of these two concepts installed in a high bypass fan duct nacelle assembly provides an optimized installation with relatively high reliability and effectiveness.

Although an example embodiment has been disclosed, a worker of ordinary skill in this art would recognize that certain modifications would come within the scope of the claims. For that reason, the following claims should be studied to determine their true scope and content.

What is claimed is:

1. A nacelle assembly for a gas turbine engine comprising:
a core nacelle defined about an engine centerline axis;
a fan nacelle assembly mounted at least partially around the core nacelle to define a fan bypass flow path, the fan nacelle assembly including a fan duct nacelle section and a fan nozzle nacelle section moveable relative to the fan duct nacelle section;
a thrust reverser system including a plurality of pivot doors movable relative to the fan nacelle assembly between a stowed position and a deployed position;
a variable area fan nozzle in communication with the fan bypass flow path;
a first actuator mounted to the fan duct nacelle section to actuate the thrust reverser system, wherein the first actuator includes a first housing mounted to the fan duct nacelle section forward of the pivot doors and a first rod that extends outwardly of the first housing to a distal end that is pivotally coupled to at least one pivot door of the plurality of pivot doors; and
a second actuator mounted to the fan duct nacelle section to move the fan nozzle nacelle section relative to the fan duct nacelle section to vary a fan nozzle exit area, and wherein the second actuator includes a second housing mounted to the fan duct nacelle section and a second rod that extends outwardly of the second housing to a distal end that is coupled to the fan nozzle nacelle section, and wherein the second housing is positioned aft of the pivot doors and aft of the first actuator.

2. The nacelle assembly according to claim 1 wherein the first and second actuators operate independently of each other.

3. The nacelle assembly according to claim 1 wherein the first actuator is configured to pivot the plurality of pivot doors relative to the fan duct nacelle section between the stowed and deployed positions as the distal end of the first rod moves relative to the first housing.

4. The nacelle assembly according to claim 1 wherein the second actuator is configured to axially translate the fan nozzle nacelle section relative to the fan duct nacelle section as the distal end of the second rod moves relative to the second housing.

5. The nacelle assembly according to claim 1 wherein the second actuator is configured to axially and radially translate the fan nozzle nacelle section relative to the fan duct nacelle section as the distal end of the second rod moves relative to the second housing.

6. The nacelle assembly according to claim 1 wherein the first actuator comprises a plurality of first actuators.

7. The nacelle assembly according to claim 1 wherein the second actuator comprises a plurality of second actuators.

8. The nacelle assembly according to claim 1 wherein the first actuator comprises a plurality of first actuators and wherein the second actuator comprises a plurality of second actuators, and wherein the first plurality of actuators are positioned forward of the pivot doors and the second plurality of actuators are positioned aft of the pivot doors.

9. The nacelle assembly according to claim 1 wherein the first actuator comprises one of a hydraulically, pneumatically, or electrically driven actuator.

10. The nacelle assembly according to claim 1 wherein the second actuator comprises one of a hydraulically, or electrically driven actuator.

11. The nacelle assembly according to claim 1 wherein the variable area fan nozzle comprises a ported variable area fan nozzle.

12. The nacelle assembly according to claim 1 wherein the variable area fan nozzle comprises a non-ported variable area fan nozzle.

13. A method of operating a gas turbine engine, wherein the engine is provided with a core nacelle defined about an engine centerline axis and a fan nacelle assembly mounted at least partially around the core nacelle to define a fan bypass flow path, the fan nacelle assembly including a fan duct nacelle section and a fan nozzle nacelle section positioned aft of the fan duct nacelle section;
the method comprising the steps of:
selectively actuating a pivot door thrust reverser system with a first actuator mounted to the fan duct nacelle section to move pivot doors between a stowed position and a deployed position, wherein the first actuator includes a first housing mounted to the fan duct nacelle section forward of the pivot doors and a first rod that extends outwardly of the first housing to a distal end that is pivotally coupled to at least one of the pivot doors; and
selectively actuating a second actuator mounted to the fan duct nacelle section to move the fan nozzle nacelle section relative to the fan duct nacelle section to vary a fan nozzle exit area, wherein the second actuator includes a second housing mounted to the fan duct nacelle section and a second rod that extends outwardly of the second housing to a distal end that is coupled to the fan nozzle nacelle section, and wherein the second housing is positioned aft of the pivot doors and aft of the first actuator.

14. The method according to claim 13 including independently controlling the first and second actuators.

15. The method according to claim 13 including pivoting the plurality of pivot doors relative to the fan duct nacelle section with the first actuator as the distal end of the first rod moves relative to the first housing.

16. The method according to claim 13 including axially translating the fan nozzle nacelle section relative to the fan duct nacelle section with the second actuator as the distal end of the second rod moves relative to the second housing.

17. The method according to claim 13 wherein the first actuator comprises a plurality of first actuators.

18. The method according to claim 13 wherein the second actuator comprises a plurality of second actuators.

19. The method according to claim 13 wherein the first actuator comprises a plurality of first actuators and wherein the second actuator comprises a plurality of second actuators, and wherein the first plurality of actuators are positioned forward of the pivot doors and the second plurality of actuators are positioned aft of the pivot doors.

20. The method according to claim 13 wherein the variable area fan nozzle comprises a ported variable area fan nozzle.

21. The method according to claim 13 wherein the variable area fan nozzle comprises a non-ported variable area fan nozzle.

22. The method according to claim 13 wherein the variable area fan nozzle comprises a ported variable area fan nozzle that moves both axially and radially.

* * * * *